(12) United States Patent
Yelton

(10) Patent No.: US 9,288,971 B2
(45) Date of Patent: Mar. 22, 2016

(54) FISHING LURE

(76) Inventor: James Joseph Yelton, Rushsylvania, OH (US)

(*) Notice: Subject to any disclaimer, the term of this patent is extended or adjusted under 35 U.S.C. 154(b) by 100 days.

(21) Appl. No.: 13/590,983

(22) Filed: Aug. 21, 2012

(65) Prior Publication Data
US 2013/0212925 A1    Aug. 22, 2013

Related U.S. Application Data

(63) Continuation-in-part of application No. 12/931,965, filed on Feb. 15, 2011, now Pat. No. 8,245,437.

(51) Int. Cl.
*A01K 85/14*    (2006.01)
*A01K 85/00*    (2006.01)

(52) U.S. Cl.
CPC ............... *A01K 85/00* (2013.01); *A01K 85/14* (2013.01)

(58) Field of Classification Search
CPC ........ A01K 85/00; A01K 85/10; A01K 85/14
USPC ............... 43/42, 42.32, 42.34, 42.19, 42.11, 43/42.15, 42.5, 42.51, 42.52, 42.45
IPC .................. A01K 85/00,85/10, 85/14
See application file for complete search history.

(56) References Cited

U.S. PATENT DOCUMENTS

| | | | |
|---|---|---|---|
| 2,575,609 A | 11/1951 | Alderman | |
| 3,805,436 A | 4/1974 | Davis | |
| 3,881,271 A | 5/1975 | Jacura | |
| 4,951,413 A | 8/1990 | Blevins | |
| 5,367,816 A | 11/1994 | Gabos | |
| 5,918,406 A | 7/1999 | Wilson | |
| 6,058,643 A | 5/2000 | Marusak | |
| 6,173,522 B1 * | 1/2001 | Couch | 43/42.22 |
| 7,216,456 B2 | 5/2007 | Kaariainen | |
| 7,360,335 B2 * | 4/2008 | Edwards | 43/42.13 |
| 2007/0006517 A1 * | 1/2007 | Grimaldi | 43/42.17 |
| 2008/0202015 A1 * | 8/2008 | Langer | 43/42.06 |

* cited by examiner

*Primary Examiner* — Lisa Tsang
(74) *Attorney, Agent, or Firm* — Standley Law Group LLP

(57) ABSTRACT

A fishing lure having a bent half-moon shape body. The top portion of the fishing lure having at least one attachment point. The bottom portion of the fishing lure is angled relative to the top portion. The shape of the fishing lure resulting in an up and down motion of the lure as it is dragged through the water.

10 Claims, 4 Drawing Sheets

FIG - 1
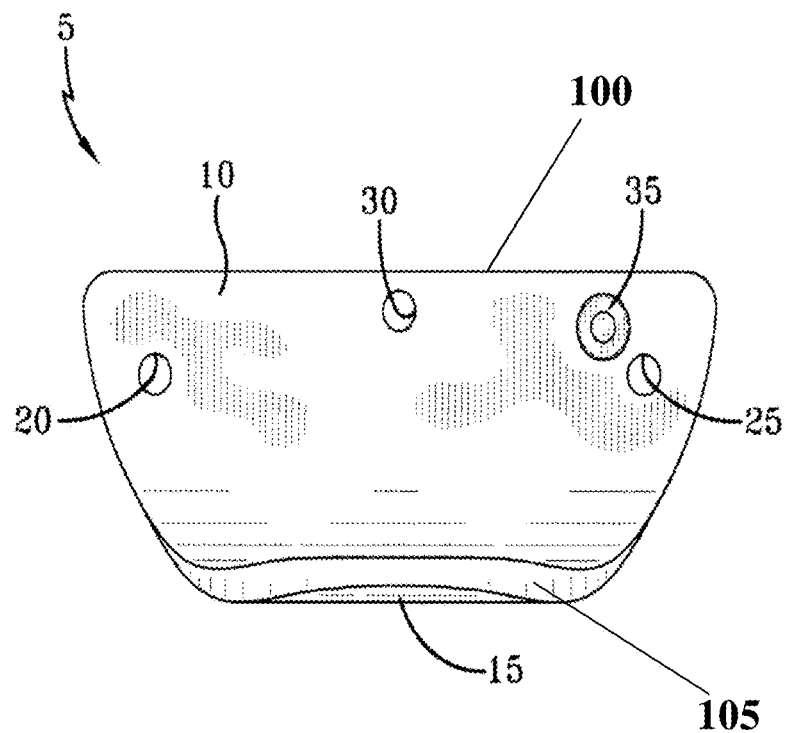
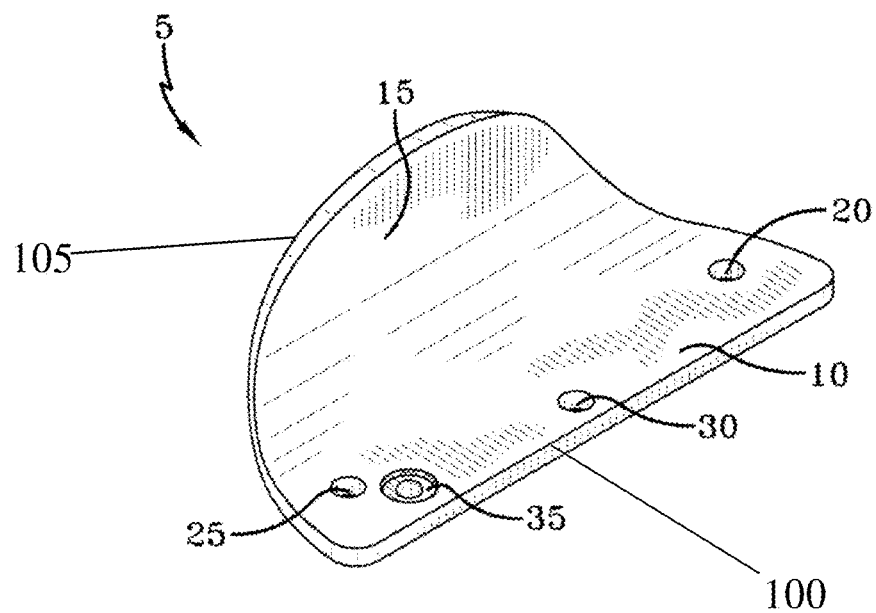
FIG-2

FISHING LURE

CROSS-REFERENCE TO RELATED APPLICATIONS

This application is a continuation-in-part of U.S. application Ser. No. 12/931,965 filed Feb. 15, 2011, now U.S. Pat. No. 8,245,437, which is incorporated by reference as if fully rewritten herein.

TECHNICAL FIELD

Exemplary embodiments of the present invention relate to a fishing lure. More particularly, the present invention relates to a fishing lure that may be used independently with attachment points for hooks or as a flasher for fishing.

BACKGROUND

Man has endeavored for centuries to master the art of fishing. Accordingly, man has sought out innovative methods and devices in order to ensure a productive day of fishing. Devices in use range from carefully crafted flies to artfully painted lures. With advancements in fishing technology comes increased specialization and increased cost. As such, there is a need for a cheap multipurpose fishing lure.

SUMMARY OF THE INVENTIVE CONCEPT

Exemplary embodiments of the present invention provide individuals with a cheap and effective fishing lure. The fishing lure embodying the inventive concept has a body having a bent half-moon configuration. The body has a top portion and a bottom portion. The bottom portion encompasses the rounded portion of the half-moon shape. Holes are drilled into the top portion to allow the attachment of hooks and line. To increase the lures attractiveness to fish an eye may be stamped into both sides of the lure to further mimic the natural prey of fish.

In other exemplary embodiments, the lure may have a single attachment point and can be used in connection with a variety of bait assemblies. Specifically, the lure may be used as a flasher or blade. The inventive shape of the lure causes the lure to experience an up and down motion as it is being pulled through the water. When the lure is attached to a bait assembly that up and down motion is imparted to bait assembly to more closely mimic live bait. The up and down motion of the lure may be controlled by the type connection to the bait assembly. By connecting the lure to a fixed point on the bait assembly, the up and down motion of the lure may simply be a pivoting about the connection point. If a longer flexible connection is used, the lure may pivot as well as travel in an arc about the bait assembly.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a front view of an exemplary embodiment of a fishing lure in accordance with the inventive concept;

FIG. 2 is a top perspective view of a fishing lure in accordance with the inventive concept;

DETAILED DESCRIPTION OF EXEMPLARY EMBODIMENT(S)

Figure 3:
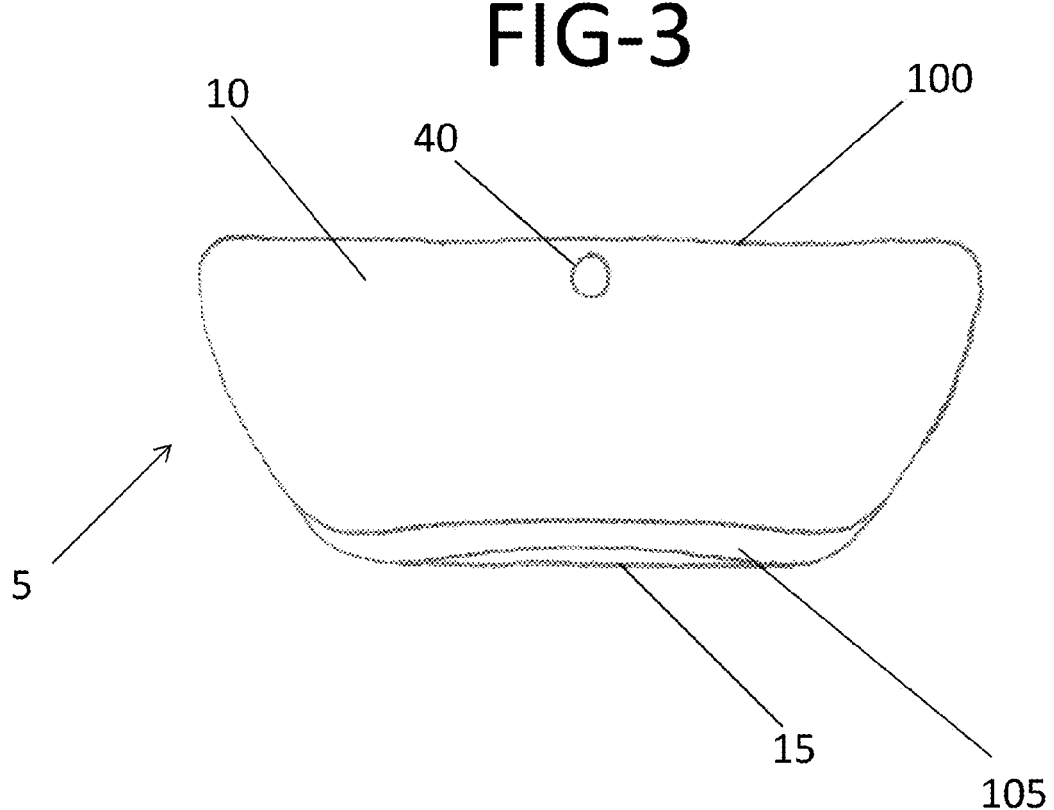
FIG. 3 is a front view of another exemplary embodiment of a fishing lure in accordance with the inventive concept that may be used as a flasher.

An exemplary embodiment of the lure 5 according to the inventive concept is illustrated in FIG. 1. As shown in FIG. 1, the lure 5 is constructed from a rigid piece of material having a bend therein. Specifically, the lure 5 begins as a circular segment that is an area of a circle informally defined as an area which is cut-off from the rest of the circle by a secant or a chord. The circle segment constitutes the part between the secant and an arc, excluding the circle's center. Accordingly, this circle segment has some arc measurement less than 180°. In other exemplary embodiments, the lure 5 may be a semicircle. As used herein the semicircle is a two-dimensional geometric shape that forms half a circle. The arc of a semicircle measures 180° or half a turn. Embodiments of the lure 5 are formed from a portion of a circle having a cut off from the circle by a chord, including a semicircle, and may have an arc measuring between about 130° to about 180°. More specifically, the arc may have a measurement of about 140°. The area of the lure 5 is defined by the arc of the circle and the chord of the circle. Accordingly, as used herein, half-moon will describe the beginning piece of material for the lure 5 as described above and will be defined as such.

The lure 5 is constructed from a half-moon piece of rigid material. The rigid material may be metal, plastic, ceramic, or other similar rigid material. In some embodiments, the lure 5 may be coated to prevent corrosion due to moisture. The lure 5 has a top portion 10, formed from the chord of the circle forming a straight edge 100, and a bottom portion 15, formed from the arc of a circle, forming a rounded edge 105. Both the top portion 10 and the bottom portion are further defined by the bend in the lure 5. The bottom portion 15 is the rounded edge 105 of the half-moon shape and represents approximately 30% to about 50% of the height of the half-moon shape.

To accomplish the desired motion in the water (up and down motion illustrated in FIG. 6), the bottom portion 15 should be bent to about a 70° to about 90° angle relative to the top portion 10. This bend and body shape allows the lure 5 to replicate the movement of live bait in order to attract fish. Given the starting half-moon shape of the material used to create the lure 5, once the bend is formed to form the lure 5, the shape may be described as a bent half-moon shape. Thus, the bent half-moon shape is a circle segment defined by a chord of a circle and an arc measuring between about 130° to 180° having about a 70° to about 90° bend therein creating a bottom portion representing approximately 30% to about 50% of the height of the starting half-moon shape.

In some embodiments, the lure 5 may have attachment points for hooks or lines. A series of holes 20, 25, 30 are placed in the lure 5 for attachment of the hooks and lines. The holes 20, 25, 30 are located in the top portion 10 of the lure 5. The first hole 20 and the second hole 25 are located near each corner formed by the intersections of the straight edge 100 with the rounded edge 105 of the top portion 10 and the third hole 30 is centrally located near the edge 100. As should be understood by those having skill in the art, hooks and lines may be attached to the holes 20, 25, 30 in a variety of configurations. Different hook and line configurations may impart different lure 5 movements in the water.

To make the lure 5 more attractive to fish, a feature mimicking an eye may be stamped in the top portion 10. In such embodiments, the eye 35 is stamped or formed into the rigid material along the straight edge 100 of the top portion 10, as shown in FIGS. 1 and 2. The eye 35 may be stamped or formed on both sides of the lure 5 to increase its visibility to passing fish.

FIG. 2 is a perspective view of the lure 5 further illustrating the bend in the rigid body of the lure 5. Although described as a bend, it should be understood that the lure 5 may be formed with the bend therein rather than actually bending the material. FIG. 2 better illustrates the relationship between the top portion 10 and the bottom portion 15. Although described as the top portion 10 and the bottom portion 15, it should be understood by those skilled in the art that either the bottom portion 15 or the top portion 10 may have a higher elevation in the water depending on orientation and movement. Accordingly, during movement of the lure 5 through the water the bottom portion 15 and the top portion 10 may alternate between higher and lower elevations relative to one another (described more fully herein). It is this motion that allows the lure 5 to mimic live bait and attract fish.

In other exemplary embodiments of the lure 5, there may be a single attachment point 40, as shown in FIG. 3. In this embodiment, the lure 5 may be used as part of a large, more complex bait assembly 200 (shown in FIGS. 5 and 6). The attachment point 40 serves to connect the lure 5 to the rest of the bait assembly 200 and is located centrally in the top portion 10 near the edge 100. In this embodiment, the lure 5 may act as the flasher or blade portion of the larger bait assembly 200. The motion of the lure 5 is imparted to the rest of the bait assembly 200 to attract fish. Whether used alone or in combination with a bait assembly 200, the overall shape of the lure 5 remains as described herein.

Figure 4:
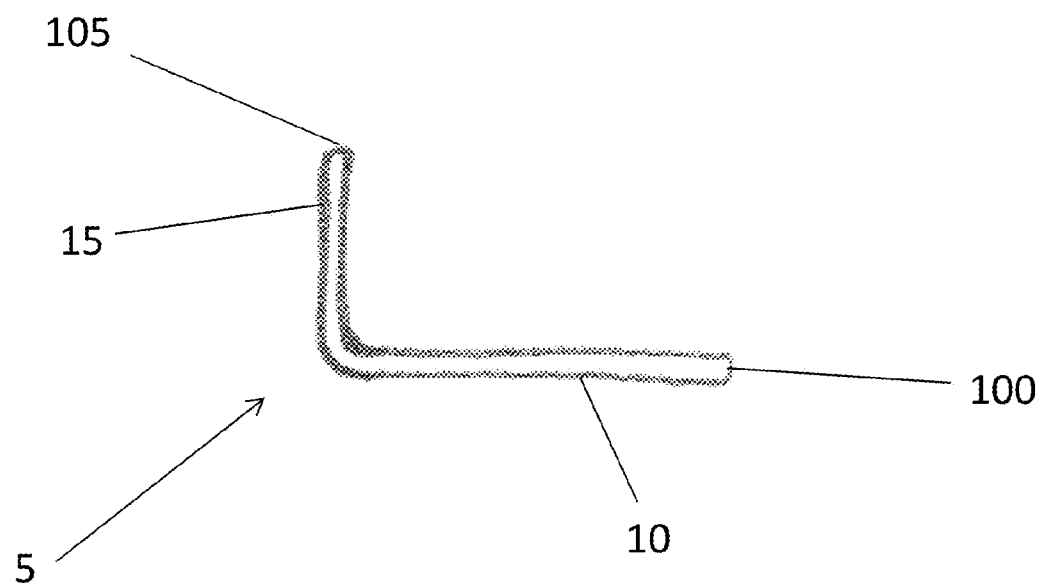
FIG. 4 is a side view of an exemplary embodiment of an inventive fishing lure.

FIG. 4 is a side view of the lure 5 illustrating the bend in the half-moon shape of the lure 5. As can be seen in FIG. 4, the bottom portion 15 is at a 90° angle relative to the top portion 10 as described herein.

Figure 5:
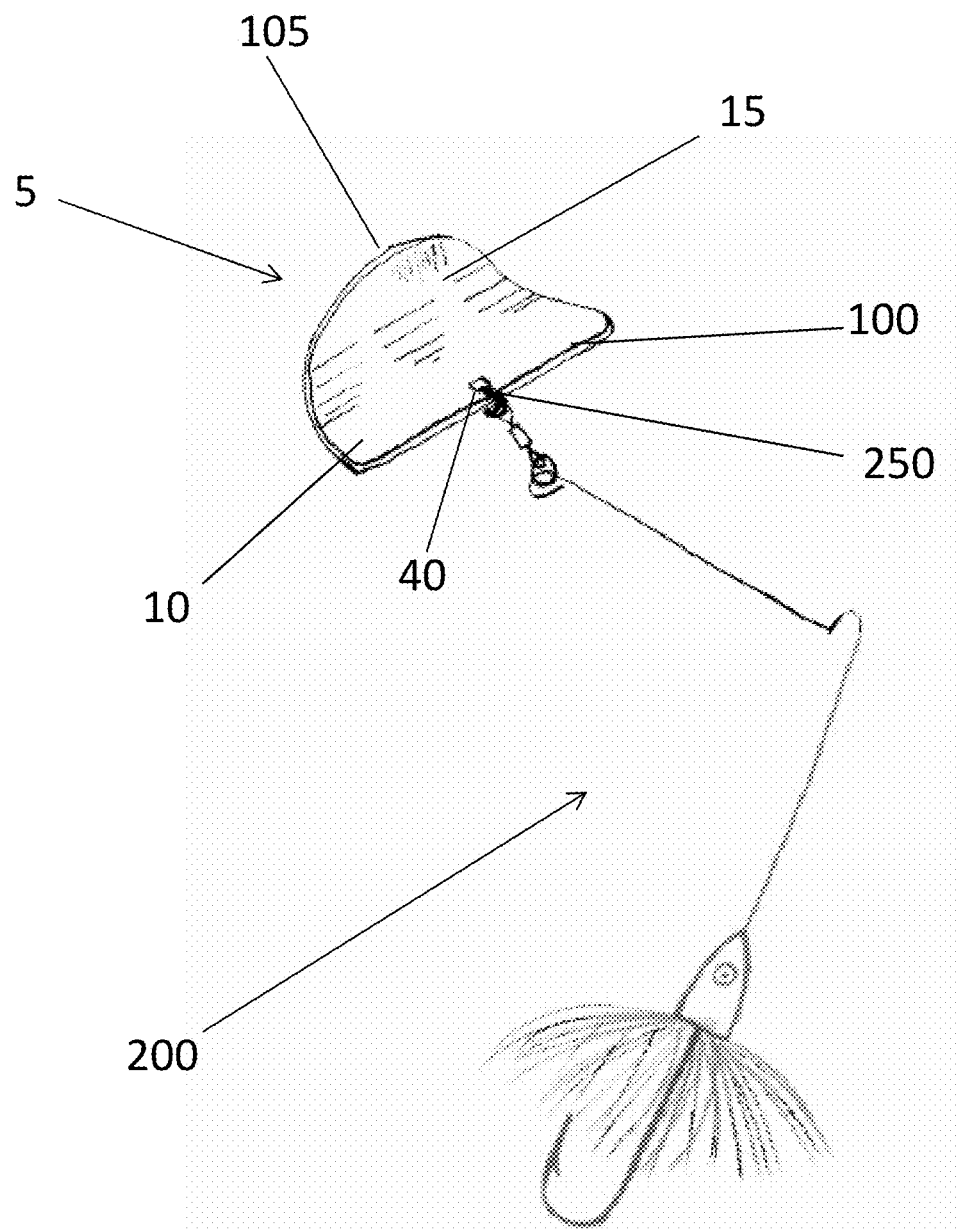
FIG. 5 is a perspective view of an exemplary embodiment of a fishing lure in accordance with the inventive concept used with a bait assembly.

The lure 5 may be used as part of the larger bait assembly 200 as shown in FIG. 5. The lure 5 is connected to the bait assembly by way of attachment point 40. As recognized by one of ordinary skill in the art the bait assembly 200 depicted in FIG. 5 is commonly referred to as a safety pin spinnerbait. The movement and pressure created by pulling the lure 5 through the water attracts fish to the bait assembly 200. Although the bait assembly 200 is shown as a safety pin spinnerbait, one of skill in the art should understand that the lure 5 can be connected to and used with jigs, spoon lures, plugs, swimbaits and other types of fishing lures.

Figure 6:
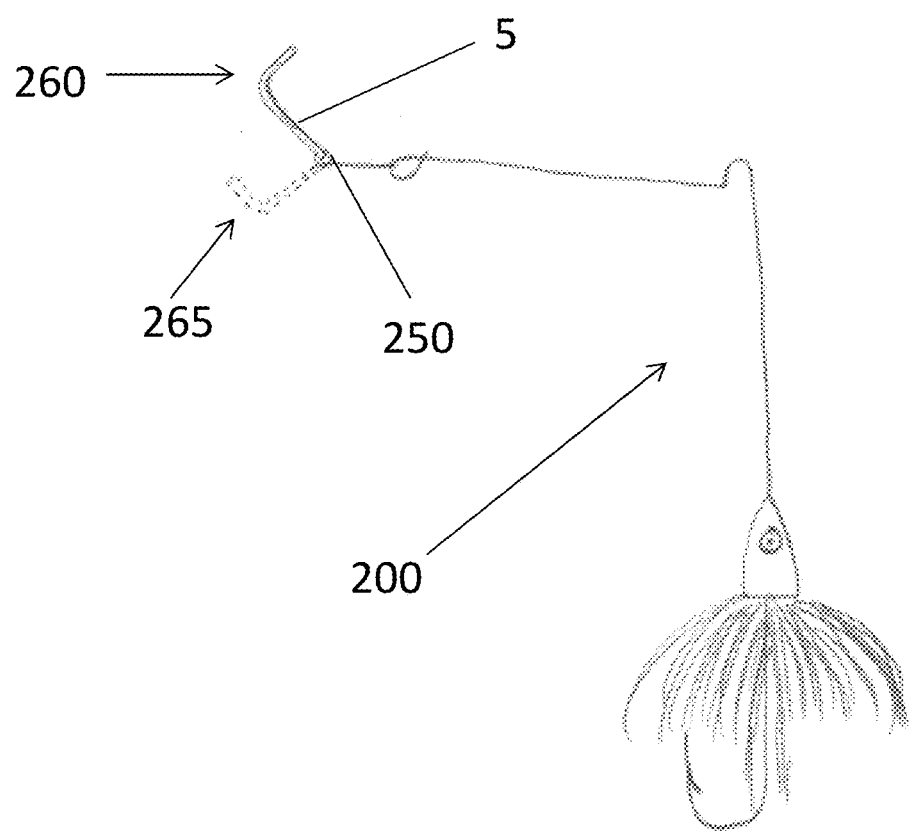
FIG. 6 is a side view illustrating the movement of the fishing lure in accordance with the inventive concept as used with a bait assembly.

FIG. 6 shows the up and down motion of the lure 5 according to the inventive concept. As with FIG. 5, FIG. 6 illustrates the lure 5 connected to a bait assembly. Due to the inventive shape and design of the lure 5, the lure 5 begins to move up and down. Depending on the type of connection between the lure 5 and the bait assembly 200, the lure 5 may pivot about the connection point 250, as shown in FIGS. 5 and 6. Depending on the lure's 5 attachment to the bait assembly, the lure 5 may also move up and down as if traveling an arc. However, unlike typical spinnerbaits the lure 5 does not spin. As illustrated, the lure 5 moves between an up position 260 and a down position 265, the down position illustrated by the dotted lines in FIG. 6. This movement created by the lure 5 creates reflections due to its own motion that may attract fish. In addition, the motion of the lure 5 may be imparted to the bait assembly 200 to more accurately mimic live bait.

Another feature of the lure 5 is its ease of manufacture. The lure 5 may start as a circular piece of rigid material. The half-moon shape of the lure 5 allows for multiple lure 5 to be cut from a single circular piece of rigid material. The holes 20, 25, 30 or attachment point 40 may be drilled in the lure 5. The half-moon shaped lure 5 may then be bent into its final shape creating the bent half-moon shape of the lure 5. During the process the eye 35 may be stamped, if desired.

The lure 5 according to the inventive concept is simple to use, as it does not require specialized bait assemblies or casting techniques to use. In addition, the lure 5 is functional over a wide range of drawing speeds and can be used alone or with a variety of bait assemblies 200. The type and degree of the up and down motion of the lure 5 may be adjusted by simply adjusting the connection between the lure 5 and the bait assembly 200. The lure 5 also lacks points preventing line tangles while in use.

While certain embodiments of the present invention are described in detail above, the scope of the invention is not to be considered limited by such disclosure, and modifications are possible without departing from the spirit of the invention as evidenced by the following claims:

What is claimed is:

1. A fishing lure comprising:
a body formed from a rigid material, said body having in its entirety a semi-circular shape having a curved edge and a straight edge;
a bend in said body, said bend forming a substantially planar top portion and a substantially planar bottom portion, said top portion defined on one side by said straight edge and said bottom portion defined on one side by said curved edge; and
at least one aperture located in said body.

2. The fishing lure of claim 1, further comprising a circular stamp in said top portion.

3. The fishing lure of claim 1, wherein said bottom portion includes about 30% to about 50% of said body.

4. The fishing lure of claim 1, wherein said body is made from metal.

5. The fishing lure of claim 1, wherein said bottom portion has a 70° to 90° angle relative to said top portion.

6. The fishing lure of claim 1, wherein said lure moves up and down when pulled through water.

7. The fishing lure of claim 1, further comprising a bait assembly attached to said lure at said at least one aperture.

8. The fishing lure of claim 7, wherein said bait assembly is a safety pin spinnerbait.

9. A fishing lure comprising:
a body, said body being in its entirety a semi-circular shape having a straight edge and a curved edge;
a bend in said body, said bend forming a substantially planar top portion and a substantially planar bottom portion, said top portion defined on one side by said straight edge and said bottom portion defined on one side by said curve;
at least one aperture located in said top portion;
a bait assembly attached to said lure at said at least one aperture;
and wherein said bottom portion includes about 30% to about 50% of said body.

10. The fishing lure of claim 9, wherein said bottom portion has a 70° to 90° angle relative to said top portion.

* * * * *